3,160,174
REMOTE POWER SHIFT CIRCUITS FOR SPOOL
VALVES AND THE LIKE
Herbert H. Schmiel, Willoughby, and Hugh J. Stacey, Chesterland, Ohio, assignors to Parker-Hannifin Corporation, Cleveland, Ohio, a corporation of Ohio
Filed Mar. 28, 1961, Ser. No. 98,918
11 Claims. (Cl. 137—625.63)

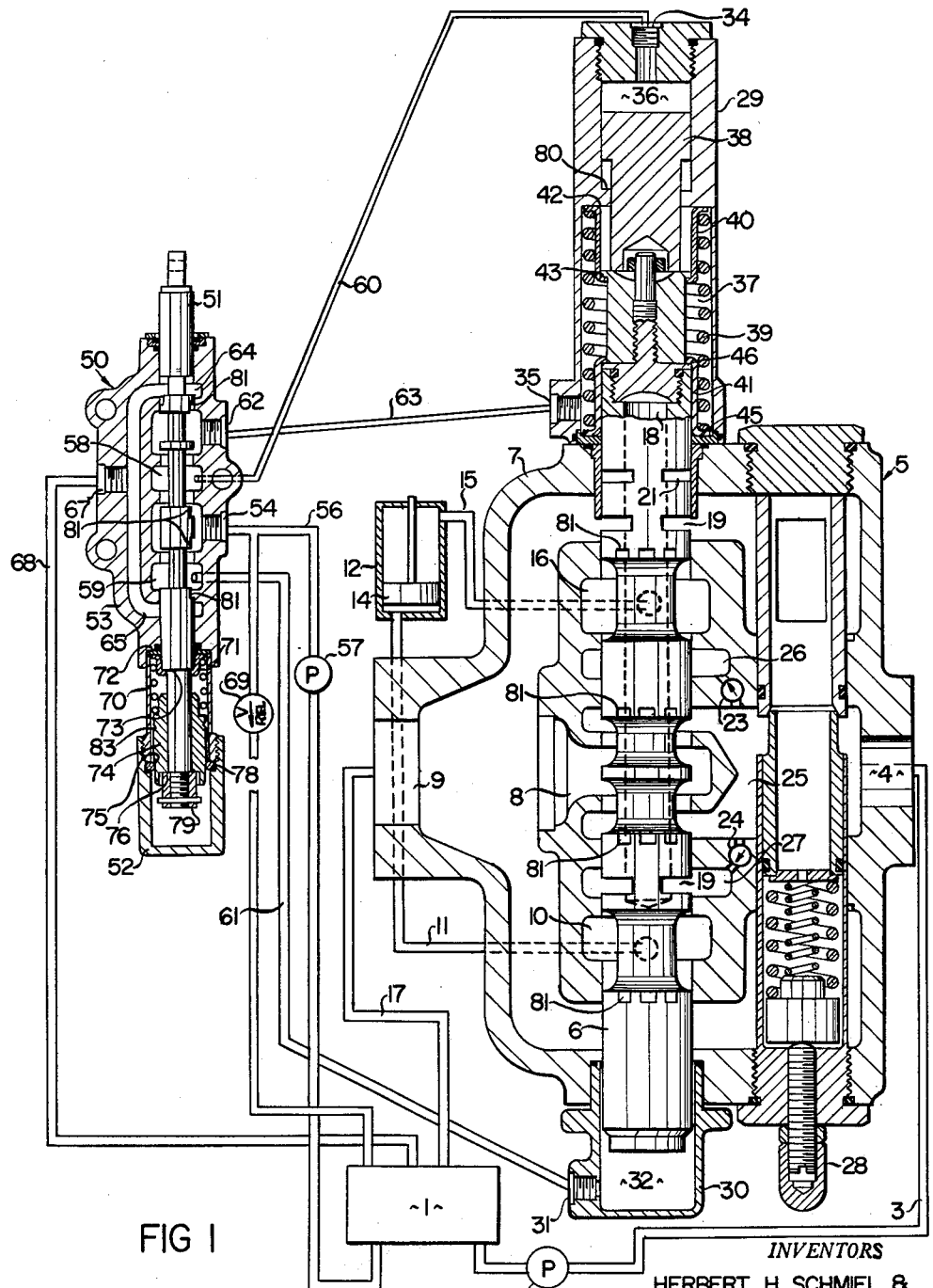

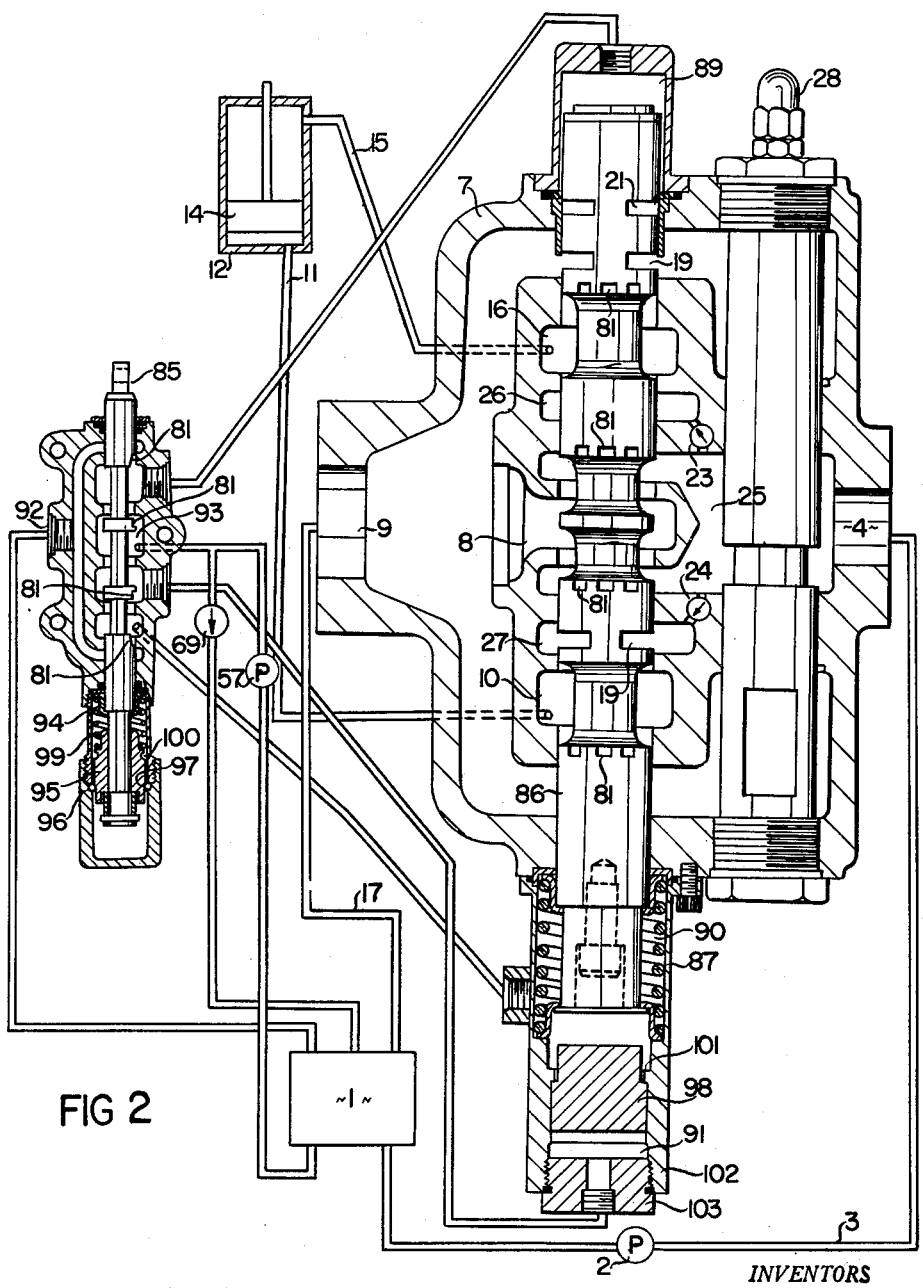

The present invention relates generally as indicated to remote power shift circuits for spool valves and the like and, more particularly, to such circuits in which the main valves for controlling the actuation of fluid motors are actuated by remote pilot valves.

In hydraulically actuated equipment employing fluid motors of relatively large size, as in material handling equipment, such as front end loaders, graders, hoes, bulldozers, power shovels, cranes, etc., the flow control spool valves thereof are of relatively large size e.g. the spools thereof may be of 2" or larger diameter and the housings therefor often are of length exceeding 2'. Aside from the large sizes of such main flow control valves, they are quite heavy and often inconvenient to mount in close quarters so as to be readily accessible to the operator of the equipment and; furthermore, the spools thereof require considerable manual effort to shift them from neutral position to the various operating positions unless complex linkage arrangements are provided to increase the mechanical advantage but, in that event, the strokes of the operating levers is considerable and thus requiring considerable free space.

Accordingly, it is a principal object of the present invention to provide small, lightweight, and easily actuated pilot valves which may be conveniently mounted close to the operator while the main valves are mounted elsewhere where convenient and near the fluid motors actuated thereby, and also near the pumps, reservoirs, and other components of the hydraulic power system.

It is another object of this invention to provide a hydraulic system in which the main and pilot circuits have their own pressure supply pumps, the main pump supplying fluid under pressure to the fluid motors via the main flow control valve and the pilot pump supplying main valve actuating pressure via the pilot valve.

It is another object of this invention to provide a remote power shift circuit in which the pilot valve is of the closed center type for fast response of its function.

It is another object of this invention to provide a remote power shift circuit for a spool valve in which feathering or metering of the pilot valve effects corresponding feathering or metering of the main spool valve whereby actuation of fluid motors may be accurately controlled.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a schematic diagram of one form of power shift circuit according to the present invention, the main and pilot valves being shown in cross-section while the remaining components of the circuit, such as the fluid motor, main and pilot pumps, relief valves, check valves, and reservoir are shown schematically; and FIG. 2 is a similar schematic diagram showing another embodiment of the present invention.

Referring now more particularly to the drawings, and first to FIG. 1, there is shown therein a fluid reservoir 1 from which the main pump 2 withdraws fluid for delivery via the conduit 3 to the inlet port 4 of the main spool valve 5. Depending on the position of the main spool 6 in the valve housing 7, (1) the fluid delivered by the main pump 2 is returned to the reservoir 1 via the bypass passage 8 and return port 9 of the main valve 5 (Neutral position), or (2) the inlet port 4 is communicated with the service port 10, and via the conduit 11, the fluid under pressure from pump 2 is delivered into the head end of the hoist cylinder 12, thus to raise the piston 14 therein and, when the main valve 5 is of the four-way type as herein shown, the fluid displaced from the cylinder 12 flows to the reservoir 1 via the conduit 15, the other service port 16, the return port 9, and the conduit 17 (Raise position), or (3) the main inlet port 4 is communicated with service port 16 whereby fluid under pressure is delivered into the rod end of the cylinder 12 through conduit 15 and the displaced fluid from the cylinder 12 is returned to the reservoir 1 via the conduit 11, the service port 10, the return port 9, and conduit 17 (Lower position), or (4) the spool 6 may be shifted beyond the Lower position whereby the inlet port 4 is communicated with the bypass 8, as in the Neutral position, but the service ports 10 and 16 are communicated with each other through the spool bore 18 and openings or slots 19 whereby the piston 14 in the cylinder 12 may descend without cavitation in the rod end and, in addition, the service ports are communicated with the return port 9 via the slots 21 in the spool 6 which, in that position, are restricted to build up a back pressure in the returning fluid from the head end of the cylinder 12 for controlled descent of the piston 14 (Float position).

It is to be noted that check valves 23, 24 are interposed between the inlet chamber 25 and the respective feed passages 26, 27, whereby in the event that a plurality of cylinders 12 are actuated by corresponding main valves 5, there will be no interflow of fluid during simultaneous operation of said cylinders under different loads. The housing 7 will also be provided with a relief valve 28 which communicates the inlet chamber 25 with the return port 9 when the pump 2 delivery pressure is greater than a prescribed maximum for which the relief valve 28 is set.

Now, with respect to the power shift aspects of the main valve 5, there are mounted cylinder bodies 29, 30 at the opposite ends of the main valve housing 7 into which the respective ends of the spool 6 extend.

The cylinder body 30 is formed with a threaded port 31 and it can be seen that fluid under pressure admitted into the chamber 32 will act on one end of the spool 6 tending to shift it upwardly in the housing 7. Similarly, the other cylinder body 29 has ports 34, 35 for admission of fluid under pressure into the chambers 36, 37 to act respectively on a plunger 38 bearing on the other end of the spool 6, and on the end of the spool 6 itself tending to shift it axially downwardly in the housing 7.

The main spool 6 is yieldably held in neutral position as shown in FIG. 1, by means of the spool centering spring 39 which has spring followers 40, 41 at its opposite ends bearing respectively on shoulders 42, 43 of body 29 and spool 6 and on shoulders 45, 46 of housing 7 and spool 6. Thus, it can be seen that when the spool 6 is moved downwardly, the top follower 40 will be moved downwardly by shoulder 43 to compress the spring 39 and, conversely, when the spool 6 is moved upwardly the other follower 41 will be moved upwardly by shoulder 46 to compress the spring 39. In this way, the spool 6 will automatically be shifted to neutral position by spring 39 when axial force on either end thereof is released or when the fluid pressures in chambers 32 and 36 are equal.

The pilot valve 50 in the FIG. 1 system comprises a much smaller spool-type valve in which, for example, the spool 51 is about ¾" in diameter and of about 13" length from the top end of the spool 51 to the bottom end of the detent housing 52. The pilot valve housing 53 is formed with an inlet port 54 which communicates by way of the conduit 56 with the pilot valve pump 57, a pair of outlet ports 58, 59 which, through conduits 60, 61, are connected respectively with the ports 34, 31 of the cylinder bodies 29, 30, a port 62 which is connected by way of conduit 63 with port 35 leading to the spring chamber 37 of the cylinder body 29, and a pair of return passages 64, 65 of the return port 67 which, in turn, by way of conduit 68, leads to the reservoir 1. In addition, there is the relief valve 69 connected in parallel with the pilot valve pump 57 to relieve pressure in excess of the predetermined maximum for which the relief valve 69 is set.

The closed center pilot spool 51 is herein shown in its neutral position at which it is yieldably held by the centering spring 70 which spring, at its opposite ends, bears on the follower 71 which engages shoulders 72, 73 of the pilot valve housing 53 and pilot spool 51 respectively, and on a follower-detent 74 which bears against shoulders 75, 76 formed by the expansible spring ring 78 in the detent housing 52 and by the collar 79 secured on the end of the spool 51. Thus, when the pilot valve spool 51 is moved downwardly until the followers 71, 74 engage, the ports 58, 59, and 62 which, in the neutral position were in communication with the pilot inlet port 54 to put equal fluid pressures in the main valve chambers 36, 37, and 32 respectively are now conditioned to actuate the main pool 6 to a position to lower the piston 14. In this Lower position of the pilot spool 51, the main chamber 32 is communicated with the pilot return port 67 while the other main chamber 36 is yet in communication with the pilot inlet port 54. At the same time, the main spring chamber 37 is also communicated with the pilot return port 67 whereby the fluid pressure acting on the top of the plunger 38 forces it and the main spool 6 downwardly a distance as determined by the plunger stop shoulder 80 to communicate the main inlet port 4 with the cylinder port 16 and the other cylinder port 10 with the main return port 9, thus to lower the piston 14 in the cylinder 2. It is to be noted that the pilot spool 51 and main pool 6 have metering slots 81 on their lands so that by metering the flow of fluid through the pilot valve 50 the main spool 6 may similarly, be maintained in different metering positions to control the rate of descent of the piston 14 in the cylinder 12.

Now, if axial downward pressure is released on the pilot spool 51, the pilot spool centering spring 70 will move the pilot spool 51 upwardly to neutral position in which all three chambers 36, 37, and 32 of the main valve are communicated with the pilot inlet port 54, whereby equal pressures acting on equal areas of the main spool will enable the main spool centering spring 39 to restore the main spool 6 to neutral position.

If it is desired to move the piston 14 in the cylinder 2 upwardly to Raise position thereby hoisting a load thereon, or raising the boom or other implement connected thereto, the pilot spool 51 is shifted upwardly from neutral position and, in this case, the top chamber 36 and the spring chamber 37 of the main valve 5 are both communicated with the pilot return port 67 while the bottom chamber 32 is communicated with the pilot inlet port 54. Accordingly, the fluid pressure acting on the lower end of the main spool 6 will overcome the force of the main spool centering spring 39, whereby the main spool 6 will be shifted upwardly to Raise position, namely, putting the main inlet port 4 in communication with the service port 10 and the other service port 16 in communication with the main return port 9. Again, as before the metering slots 81 on both the main and pilot spools 6 and 51 will enable metering or feathering of the flow through the main valve 5 in response to placement of the pilot spool 51 in feathering or metering position. When the axial upward force on the pilot spool 51 is released, the spring 70 again will restore the pilot spool 51 to neutral position in which all three main valve chambers 36, 37, and 32 are communicated with the pilot inlet port 54, whereby the main centering spring 39 will restore the main spool 6 to neutral position, thereby blocking both of the service ports 10 and 16 from the inlet port 4 and freely circulating the main pump delivery through the bypass 8 to the return port 9.

In the present case, the pilot and main valves 50 and 5 each have a fourth position, namely, a Float position, which is a position adjacent the Lower position. The pilot spool 51, when shifted to the Lower position brings the juxtaposed ends of the spring followers 71, 74 into abutting engagement, whereupon additional axial downward pressure on the pilot spool 51 will force the detent-follower 74 downwardly, the beveled shoulder 75 of the latter causing expansion of the spring detent ring 78. Once said ring 78 engages the outer cylindrical surface of the follower-detent 74, the spool centering spring 70 will expand to force the detent-follower 74 downwardly until its peripheral groove 83 comes in register with the ring 78. At that time the split ring 78 will engage in the peripheral groove 83 to yieldably hold the pilot spool 51 in that position even though axial downward force is released. In this Float position of the pilot spool 51, both of the chambers 36 and 37 of the main valve 5 will be communicated with the pilot inlet port 54 while the bottom chamber 32 is communicated with the pilot return port 67, and, therefore, the fluid pressure in the main spring chamber 37 will cause shifting of the main spool 6 beyond the Lower position and thereby put the main spool 6 in the Float position in which the service ports 10 and 16 are in communication with each other through the spool bore 18 and slots 19, and in which the orifice 21 causes buildup of back pressure in the fluid displaced from the head end of the cylinder 12.

As aforesaid, the pilot valve 50 is of the closed center type which provides for fast response of the pilot function, since pressure is always at maximum at the inlet port 54.

Referring now to FIG. 2, when the closed center type pilot valve spool 85 is in the neutral position, the main spool 86 likewise is held in neutral position by its centering spring 87, there being equal pressures in the three chambers 89, 90, and 91 of the main valve. When the pilot spool 85 is shifted upwardly to Raise position, the top chamber 89 is communicated with the pilot return port 92 while the bottom chamber 91 is yet in communication with the pilot inlet port 93, as is the spring chamber 90. Accordingly, the main spool 86 will be shifted upwardly to Raise position.

When the pilot spool 85 is shifted downwardly from neutral position to Lower position, that is, where the followers 94, 95 engage each other with the detent-follower 95 held against downward movement by the split detent ring 96 bearing on the beveled shoulder 97, the spring chamber 90 is communicated with the pilot return port 92 while both the top and bottom chambers 89 and 91 are yet in communication with the pilot inlet port 93. Accordingly, the main spool 86 will be forced downwardly compressing the centering spring 87 until the end of the main spool 86 engages plunger 98 in chamber 91. Thus, the plunger 98 since it is held in the position shown in FIG. 2 by fluid under pressure therebeneath in chamber 91 serves as a stop to arrest the movement of the main spool 86 to the Lower position. When the pilot spool 85 is in the Lower position, release of axial pressure thereon causes it to be restored to neutral position as by its centering spring 99 and, likewise, the admission of fluid pressure into the spring chamber 90 of the main valve permits its centering spring 87 to restore it back to neutral position.

The circuit of FIG. 2 also includes a Float position of the pilot and main valve spools 85 and 86, this being downwardly adjacent the Lower position. When the pilot spool 85 is shifted downwardly past the Lower position to the Float position, the spring ring 96 snaps into the groove 100 of the detent-follower 95 thus to hold the pilot spool 85 in the Float position despite removal of axial downward force thereon. In the Float position of the pilot spool 85, the spring chamber 90 and bottom chamber 91 are both communicated with the pilot return port 92 whereupon the pilot pressure in the top chamber 89 forces the main spool 86 downwardly until its end engages the shoulder 101 in the cylinder body 102 or until plunger 98 engages the plunger 103. As in FIG. 1, in the Float position, the piston 14 may descend in the cylinder 12 with back pressure being built up in the returning fluid by reason of the restrictor arrangement (or conventional check valve arrangement) in the spool 86, and the rod end of the cylinder 12 is kept filled with fluid while the excess fluid displaced from the head end passes into the reservoir 1 by way of the main return port 9.

It can thus be seen that novel means have herein been provided for pilot actuation of a main valve through a similar, but much smaller and compact pilot valve. In addition, in the circuits herein disclosed, the pilot spools 51, 85 and the main spools 6, 86 are provided with suitable metering slots 81 which, in response to metering positions of the pilot spools, effects corresponding metering of the flow of fluid through the main spool valves to the cylinders 12. Yet another feature is the provision of the closed center type pilot valves which provide for instantaneous response of the main valves since maximum pressure is at all times available in the main valve chambers through which actuation of the main spool to its various positions is effected by venting desired chambers to the reservoir 1 via the pilot valves.

With further reference to actuation of the main spool 6 or 86 to metering or feathering positions responsive to actuation of the pilot spool 51 or 85 to such position it can be seen that when the pilot spool is moved up a distance short of the Raise position (or down a distance short of the Lower position), the metering slots 81 are effective to keep the vented chamber or chambers of the main valve in restricted communication with both the pilot return and pilot inlet ports, thus to maintain desired pressure in such chamber or chambers for causing shifting of the main spool to a position just short of the Raise (or Lower) position. The metering slots 81 of the main spool 6 or 86 serve to establish restricted flow from main inlet port 4 to the return port 9 (via bypass 8) with consequent pressure drop in inlet port 4 and to establish restricted flow between the service port 16 or 10 and return port 9 with consequent pressure buildup in the return circuit from the cylinder 12. Such inlet pressure drop and return pressure buildup vary in inverse proportion to effect movement of the piston 14 at the desired speed.

Other modes of applying the principle of the invention may be employed, change being made as regards the details described, provided the features stated in any of the following claims, or the equivalent of such, be employed.

We therefore particularly point out and distinctly claim as our invention:

1. In combination, a main flow control valve comprising a housing having a main spool with plunger portions extending into chambers in said housing for fluid pressure actuation of said main spool to different axial flow control positions; and a pilot valve comprising a body having an inlet port for fluid under pressure, a vent port, and a plurality of control ports and passages leading into the respective chambers, and a pilot valve member movable in said body from a position communicating said inlet port with said control ports and chambers to positions selectively communicating said control ports and chambers with said vent port whereby fluid pressure in non-selected ports and chambers actuate said main spool to said different flow control positions, one plunger portion being separate from, but engageable with, said main spool and having limited axial travel in said housing to determine one axial position of said main spool, said one plunger portion, when exposed to fluid pressure in the associated chamber, constituting a stop for actuation of said main spool by fluid pressure in another chamber and, when said associated chamber is communicated with said vent port, permitting actuation of said main spool in the same direction by fluid pressure in said another chamber.

2. In combination, a main flow control valve comprising a housing having a bore intersected axially therealong by an inlet port, by a return port, and by a pair of service ports; a main spool axially reciprocable in said bore from a spring-held neutral position whereat fluid communication between inlet port and both service ports is blocked to either of two operating positions whereat said inlet port is in fluid communication with one of said service ports, and said return port is in fluid communication with the other of said service ports or, vice versa, whereby the movable component of a double acting fluid motor connected to said service ports may be actuated in opposite directions by fluid pressure supplied through said inlet port; said main spool further being axially shiftable in said bore to a third operating position whereat said service ports are in fluid communication with each other; said main spool having its ends extending into chambers in said housing to constitute plungers for fluid pressure actuation of said main spool in opposite directions to two of the three operating positions; a third plunger adjacent one end of said main spool extending into a third chamber in said housing to determine the extent of axial shifting of said main spool to the remaining one of the three operating positions; and a pilot valve operative to selectively conduct fluid under pressure to said three chambers.

3. The combination of claim 2 wherein said pilot valve is of the closed center type to maintain equal fluid pressures in said chambers when said main spool is in neutral position and to selectively vent said chambers whereby said main spool is actuated to selected operating positions by fluid pressure in unvented chambers.

4. The combination of claim 2 wherein said third plunger has limited axial travel in said housing, and when actuated by fluid pressure, engages said one end of said main spool to shift it from neutral position to one operating position; and wherein the plunger constituted by said one end of said main spool, when actuated by fluid pressure shifts said main spool from said one operating position to said third operating position.

5. The combination of claim 2 wherein said third plunger, when actuated by fluid pressure, constitutes a stop to limit actuation of said main spool from neutral position to one of said two operating positions; said third plunger, when fluid pressure thereon is released, permitting fluid pressure actuation of said main spool from said one operating position to said third operating position.

6. The combination of claim 2 wherein said bore is also intersected by a bypass passage which communicates said inlet port with said return port when said main spool is in neutral position.

7. The combination of claim 2 wherein a main pump is operatively connected to said inlet port; and wherein a pilot pump is operatively connected to said pilot valve.

8. The combination of claim 7 wherein said pilot valve is of the closed-center type to maintain fluid pressure in said chambers in the neutral position of said main spool, and to selectively vent said chambers for actuation of said main spool by fluid pressure in unvented chambers.

9. The combination of claim 8 wherein a relief valve is operatively disposed between said pilot pump and said pilot valve to thus maintain such fluid pressure in unvented chambers of said main valve.

10. In combination, a main flow control valve comprising a housing having a main spool with plunger portions extending into chambers in said housing for fluid pressure actuation of said main spool to different axial flow control positions; said housing having an inlet port, a return port, and at least one service port for connection with a fluid motor; a pilot valve comprising a body having an inlet port and a plurality of control ports and unrestricted passages leading into the respective chambers, a return port, and pilot valve means movable in said housing, said pilot valve means being operative when in a neutral position to communicate said body inlet port with said control ports through said unrestricted passages to conduct fluid under pressure to said chambers, and being operative when moved to an operative position selectively to vent said chambers through the same passages to said return port, whereby said main spool is actuated to selected operating positions by fluid pressure in unvented chambers.

11. In combination, a main flow control valve comprising a housing having a main spool with plunger portions extending into chambers in said housing for fluid pressure actuation of said main spool to different axial flow control positions; said housing having an inlet port, a return port, and at least one service port for connection with a fluid motor; a main pump having its discharge port connected to said inlet port; a pilot valve comprising a body having an inlet port and a plurality of control ports and passages leading into the respective chambers, and a pilot valve member movable in said housing selectively to communicate said body inlet port with said control ports to conduct fluid under pressure to said chambers to shift said main spool to different flow control positions; a pilot pump having its discharge port connected to the inlet port of said body, said pilot valve being of the closed center type in which the movement of said pilot valve member selectively vents such opposed chambers thereby to provide for prompt actuation of said main spool as soon as one of the opposed chambers is vented; and a spring acting on said main spool for urging the same to an inactive position closing communication between the inlet port and service port of said housing when opposed plunger portions in corresponding chambers are exposed to fluid pressure from said pilot pump and said pilot valve.

References Cited in the file of this patent

UNITED STATES PATENTS

| | | |
|---|---|---|
| 1,926,076 | Whalen | Sept. 12, 1933 |
| 1,943,061 | Donglas | Jan. 9, 1934 |
| 2,157,240 | Keel | May 9, 1939 |
| 2,423,472 | Welsh | July 8, 1947 |
| 2,507,868 | Purcell | May 16, 1950 |
| 2,649,107 | Avery | Aug. 18, 1953 |
| 2,709,421 | Avery | May 31, 1955 |
| 2,868,227 | Stephens | Jan. 13, 1959 |
| 2,920,650 | Moog | Jan. 12, 1960 |
| 2,958,340 | Rosebrook | Nov. 1, 1960 |
| 2,961,001 | Pippenger | Nov. 22, 1960 |
| 2,981,287 | Caslow | Apr. 25, 1961 |
| 2,985,147 | Rockwell | May 23, 1961 |
| 3,000,397 | Schmiel | Sept. 19, 1961 |

FOREIGN PATENTS

| | | |
|---|---|---|
| 301,531 | Germany | Nov. 2, 1917 |
| 1,197,898 | France | June 8, 1959 |